US011115624B1

(12) United States Patent
Brown et al.

(10) Patent No.: US 11,115,624 B1
(45) Date of Patent: Sep. 7, 2021

(54) METHODS AND SYSTEMS FOR JOINING A CONFERENCE (71) Applicant: Salesloft, Inc., Atlanta, GA (US)

(72) Inventors: Austin Brown, Atlanta, GA (US); Matt Finneran, Atlanta, GA (US)

(73) Assignee: Salesloft, Inc., Atlanta, GA (US)

( * ) Notice: Subject to any disclaimer, the term of this patent is extended or adjusted under 35 U.S.C. 154(b) by 0 days.

(21) Appl. No.: 16/518,367

(22) Filed: Jul. 22, 2019

(51) Int. Cl.
H04N 7/15 (2006.01)
H04L 29/08 (2006.01)

(52) U.S. Cl.
CPC ............. *H04N 7/15* (2013.01); *H04L 67/02* (2013.01)

(58) Field of Classification Search
USPC ........... 348/14.01, 14.03, 14.08, 211.3, 159, 348/211.11, 211.12
See application file for complete search history.

(56) References Cited

U.S. PATENT DOCUMENTS

| | | | |
|---|---|---|---|
| 7,760,865 B2 | 7/2010 | Awan et al. | |
| 8,064,342 B2 | 11/2011 | Badger | |
| 8,631,069 B2 | 1/2014 | Maes | |
| 9,256,695 B1 | 2/2016 | Willis et al. | |
| 9,392,122 B2 | 7/2016 | Sall | |
| 9,699,409 B1 * | 7/2017 | Reshef | G06F 3/0484 |
| 9,992,448 B2 | 6/2018 | Reshef et al. | |
| 10,218,839 B2 | 2/2019 | Gupta et al. | |
| 10,325,284 B1 | 6/2019 | Aggarwal et al. | |
| 2007/0206759 A1 | 9/2007 | Boyanovsky | |
| 2009/0274284 A1 | 11/2009 | Arsenault et al. | |
| 2010/0135477 A1 | 6/2010 | Chen | |
| 2010/0205543 A1 * | 8/2010 | Von Werther | H04L 67/306 715/753 |
| 2010/0223389 A1 | 9/2010 | Ananthanarayanan et al. | |
| 2011/0228921 A1 | 9/2011 | Singh et al. | |
| 2011/0271210 A1 * | 11/2011 | Jones | H04L 67/36 715/753 |
| 2012/0051267 A1 | 3/2012 | Ma et al. | |
| 2012/0137367 A1 | 5/2012 | Dupont et al. | |
| 2013/0076853 A1 | 3/2013 | Diao | |
| 2013/0191719 A1 | 7/2013 | Underhill et al. | |
| 2014/0006611 A1 | 1/2014 | Perez | |
| 2015/0036810 A1 | 2/2015 | Rashid et al. | |
| 2016/0212269 A1 | 7/2016 | Backhaus | |
| 2016/0253314 A1 | 9/2016 | Pottier et al. | |

(Continued)

OTHER PUBLICATIONS

WebEx Meeting Center with Collaboration Meeting Rooms (CMR Cloud) User Guide, https://www.cisco.com/c/en/us/td/docs/collaboration/meeting_center/wbs2913/CMR_Cloud_User_Guide.pdf, total 24 pages, Publication Date: Aug. 1, 2014.
Pexip Mobile App for Android Quick Guide, https://docs.pexip.com/files/v8/Pexip_Mobile_App_Android_Quickguide_v8.a.pdf, Total 4 pages, Publication Date: Feb. 2015.

(Continued)

*Primary Examiner* — Yosef K Laekemariam
(74) *Attorney, Agent, or Firm* — DLA Piper LLP (US)

(57) ABSTRACT

Systems and methods for joining a video conference. A first function can be found, wherein the first function can interact with a user interface element used by the recording bot server to join a video conference. The first function can be replaced by a second function, wherein the second function can be used to join the video conference such that the recording bot server does not interact with the user interface element. The second function can be used to join the video conference without interacting with the DOM.

19 Claims, 7 Drawing Sheets

(56) References Cited

U.S. PATENT DOCUMENTS

| | | |
|---|---|---|
| 2016/0381215 A1 | 12/2016 | Goyal et al. |
| 2017/0257598 A1 | 9/2017 | Reshef et al. |
| 2017/0345325 A1* | 11/2017 | Metts .................... G09B 5/065 |
| 2018/0082208 A1 | 3/2018 | Comier et al. |
| 2018/0121828 A1 | 5/2018 | Keysers et al. |
| 2018/0176661 A1 | 6/2018 | Varndell et al. |
| 2018/0191901 A1 | 7/2018 | Aleksin et al. |
| 2018/0227339 A1 | 8/2018 | Rodriguez et al. |
| 2018/0239822 A1 | 8/2018 | Reshef et al. |
| 2018/0249007 A1 | 8/2018 | Seward et al. |
| 2018/0249122 A1 | 8/2018 | Reshef et al. |
| 2018/0268318 A1 | 9/2018 | Matam et al. |
| 2018/0330736 A1 | 11/2018 | Faulkner et al. |
| 2019/0068390 A1 | 2/2019 | Gross et al. |
| 2019/0068526 A1 | 2/2019 | Xie et al. |
| 2019/0102846 A1 | 4/2019 | Loschiavo |
| 2019/0182183 A1 | 6/2019 | Hubauer et al. |
| 2019/0205772 A1 | 7/2019 | Kohlmeier et al. |
| 2019/0318743 A1 | 10/2019 | Reshef et al. |

OTHER PUBLICATIONS

Lync conference invitations in SIP terms, http://blog.greenl.ee/2011/12/15/lync-conference-invitations/, Total 7 pages, Publication Date: Dec. 15, 2011.

RFC4579—Session Initiation Protocol (SIP) Call Control—Conferencing for User Agents, https://datatracker.ietf.org/doc/rfc4579/ , pp. 3, Publication Date: Aug. 2006.

U.S. Appl. No. 16/558,692.

U.S. Appl. No. 16/524,653.

U.S. Appl. No. 15/852,259, filed Dec. 22, 2017, Pending.

U.S. Appl. No. 16/558,692, filed Jul. 22, 2019, U.S. Pat. No. 10,791,217.

U.S. Appl. No. 16/524,653, filed Jul. 29, 2019, U.S. Pat. No. 10,742,695.

U.S. Appl. No. 16/855,610, filed Apr. 22, 2020, Pending.

U.S. Appl. No. 16/987,846, US 2021-00676226, filed Mar. 4, 2021, Pending.

U.S. Appl. No. 15/852,259.

U.S. Appl. No. 16/855,610.

U.S. Appl. No. 16/897,846.

U.S. Appl. No. 17/206,916.

* cited by examiner

METHODS AND SYSTEMS FOR JOINING A CONFERENCE

DESCRIPTION OF EMBODIMENTS OF THE INVENTION

Figure 1A:
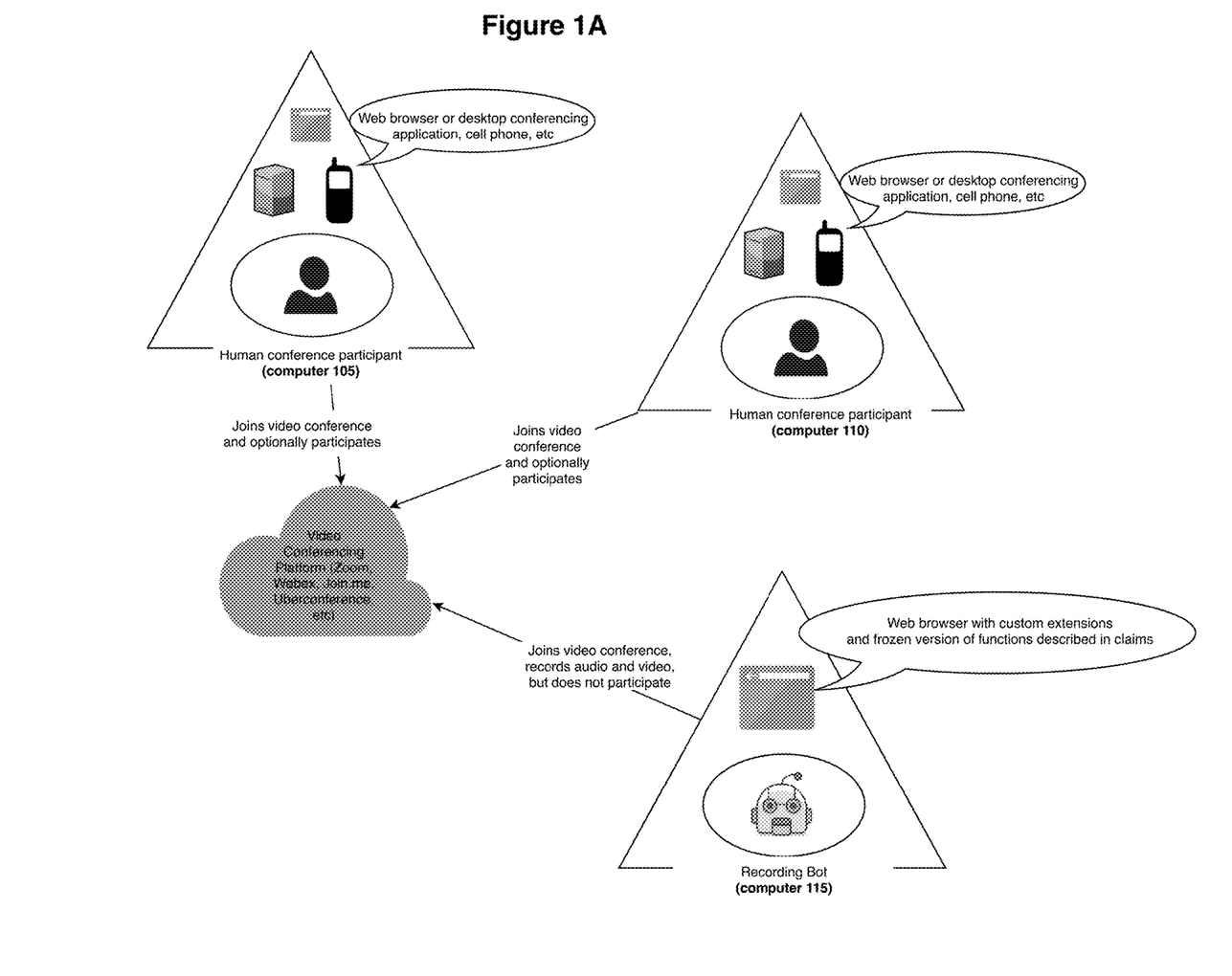
FIG. 1A illustrates a system for calling into a video conference (e.g., meeting) without interacting with a user interface element, according to an embodiment.
Figure 1B:
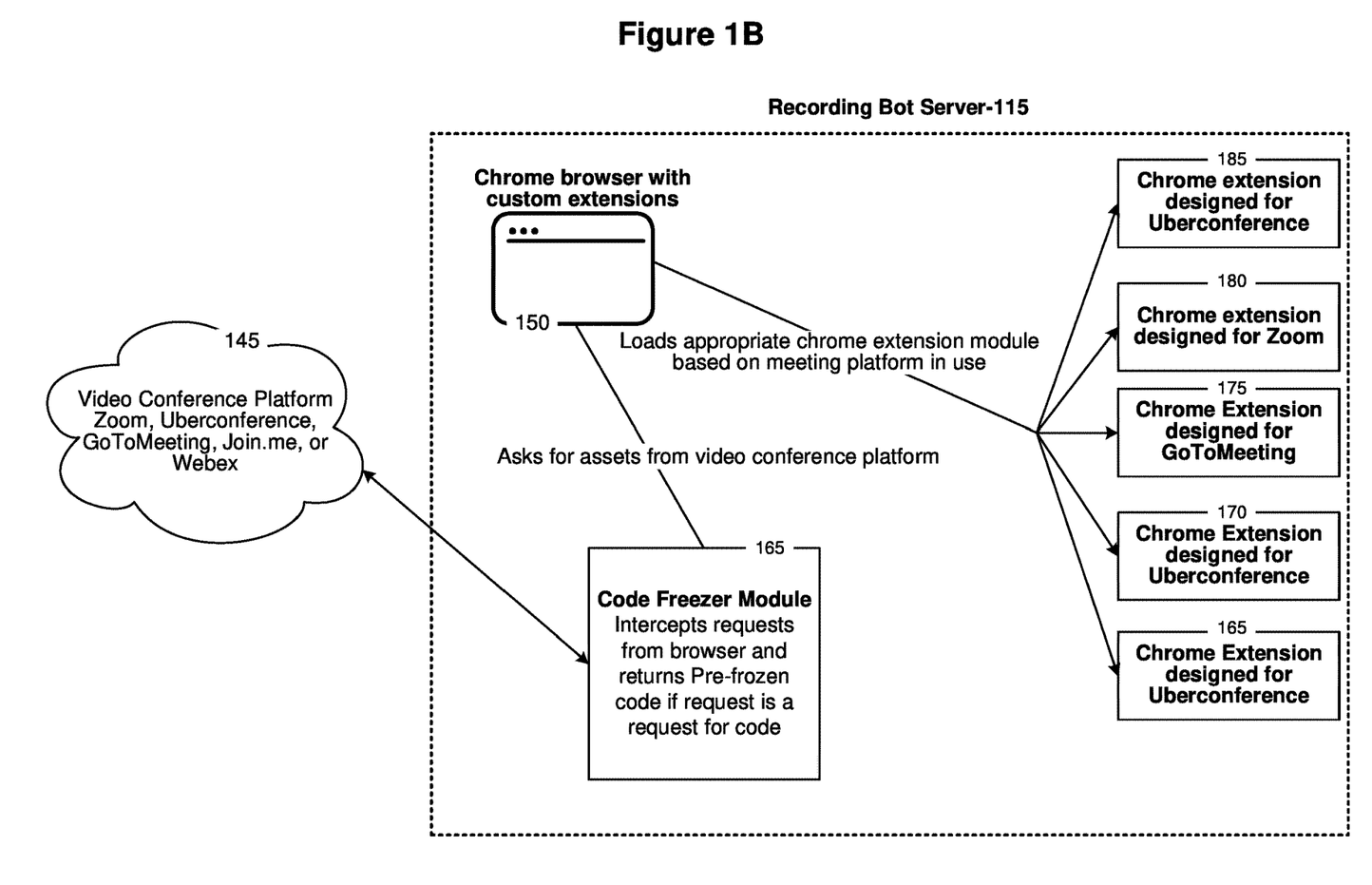
FIG. 1B also illustrates a system for calling into a video conference (e.g., meeting) without interacting with a user interface element, according to an embodiment.

FIGS. 1A-1B illustrate a system for calling into a video conference (e.g., meeting) without interacting with a user interface element (e.g., a document object model (DOM), a graphical user interface (GUI), a user interface (UI)), according to an embodiment. The video conference can be joined using, for example, the Internet or an Intranet. The DOM can be an application programming interface (API) (e.g., the graphical user interface (GUI). It can define the logical structure of documents and the way a document is accessed and manipulated. The video conference can be called without interacting with the DOM (or GUI, or UI) by, for example, entering meeting details (e.g., the name of the bot, the meeting ID), clicking buttons to activate the session, etc.). The system can be used with previously existing code (e.g., see the examples of FIGS. 2 and 4 below, where Zoom and UberConference are used) or newly incorporated code (e.g., see the examples of FIGS. 3, 5 and 6 below, where WebEx, Join.me, and GoToMeeting are used).

In FIG. 1A, a human conference participant computer 105 can join the video conference and optionally participate. The human conference participant computer 105 can use a Web browser, desktop conferencing application, cell phone, etc. A human conference host computer 110 can join the video conference and optionally participate. The human conference host computer 110 can use a Web browser, desktop conferencing application, cell phone, etc. A recording bot server 115 can join the video conference, and record the audio and/or video, but not participate. The recording bot server 115 can use a Web browser with custom extensions and a frozen version of the functions referenced in FIGS. 2-6 below.

In FIG. 1B, the recording bot server 115 can initiate a Chrome browser 150 with a custom extension designed for a particular video conference platform 155 (e.g., for WebEx, Join.me, GoToMeeting, Zoom, UberConference). The appropriate Chrome extension module can be loaded based on the meeting platform in use. The Chrome browser 150 can request a connection to the video conference platform. In some embodiments, rather than have the video conference platform provide the Chrome browser 150 with its version of code, a code freezer module 160 can intercept some of the requests for code that the video conference platform would return and instead return a frozen version of code that includes either modified versions of the code, or versions of code that expose certain underlying functions, as described in detail in FIGS. 2-6. Upon receiving the frozen code, the Chrome browser 150 can initiate custom-designed Chrome extensions (e.g., WebEx Chrome extension 165, Join.me Chrome extension 170, GoToMeeting Chrome extension 175, Zoom Chrome extension 180, UberConference Chrome extension 185) that can interact with the frozen code in order to record the meeting.

Figure 2:
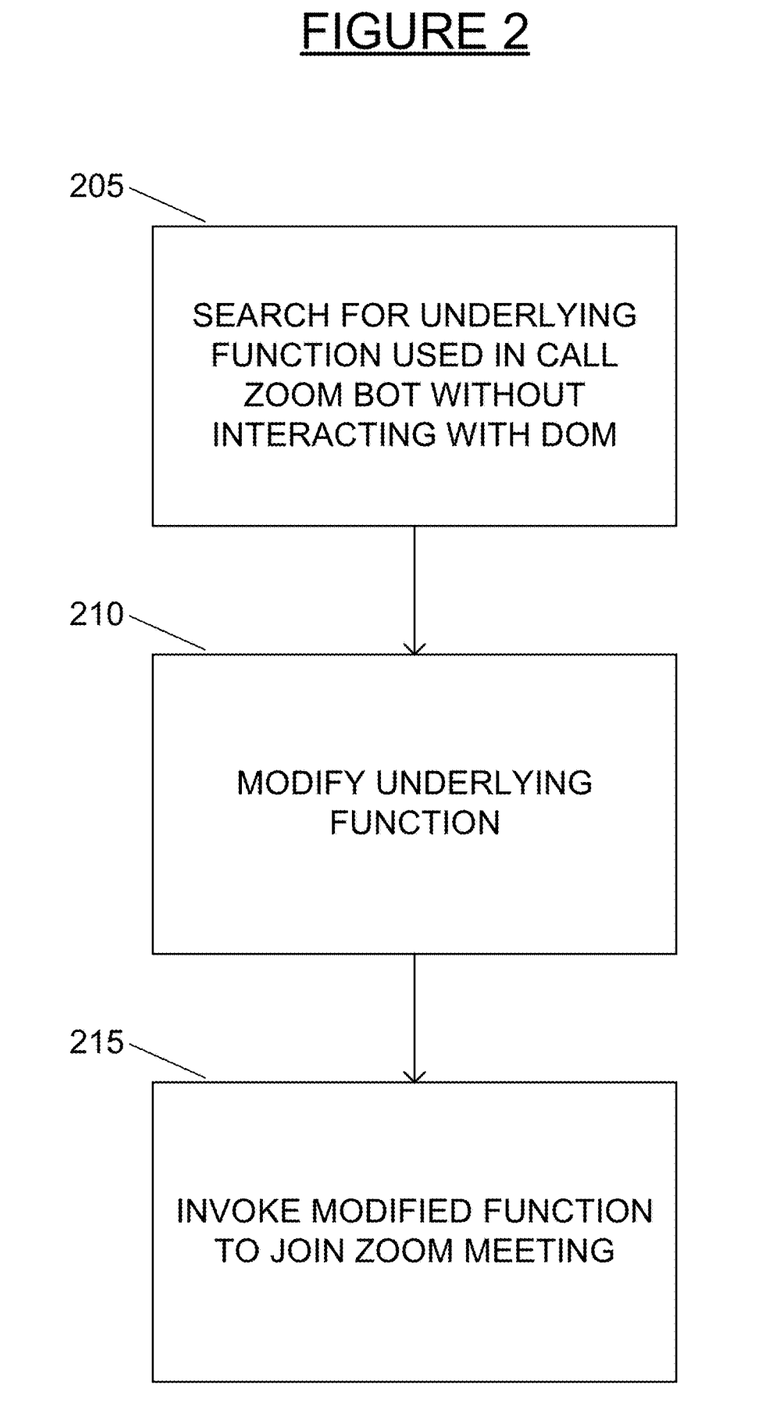
FIG. 2 illustrates calling into a Zoom meeting, according to an embodiment.
Figure 3:
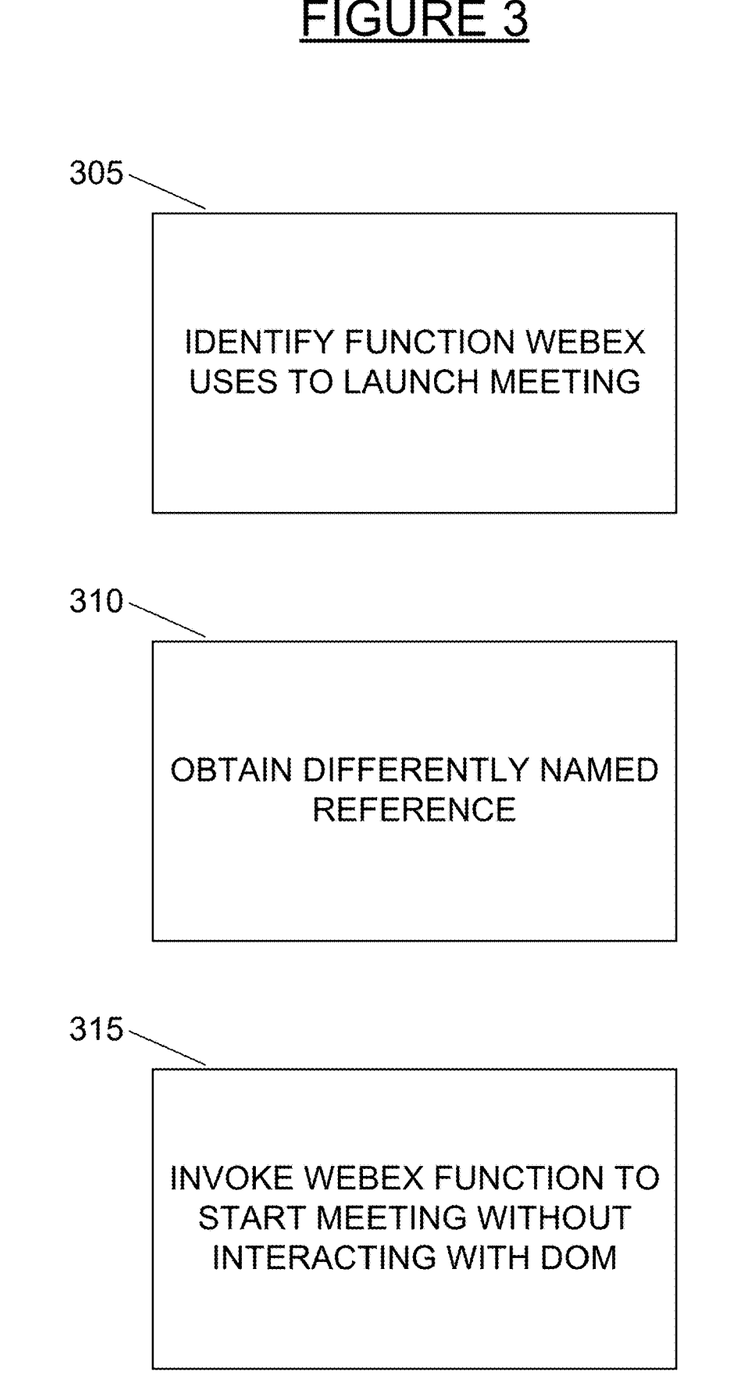
FIG. 3 illustrates calling into a WebEx meeting, according to an embodiment.
Figure 4:
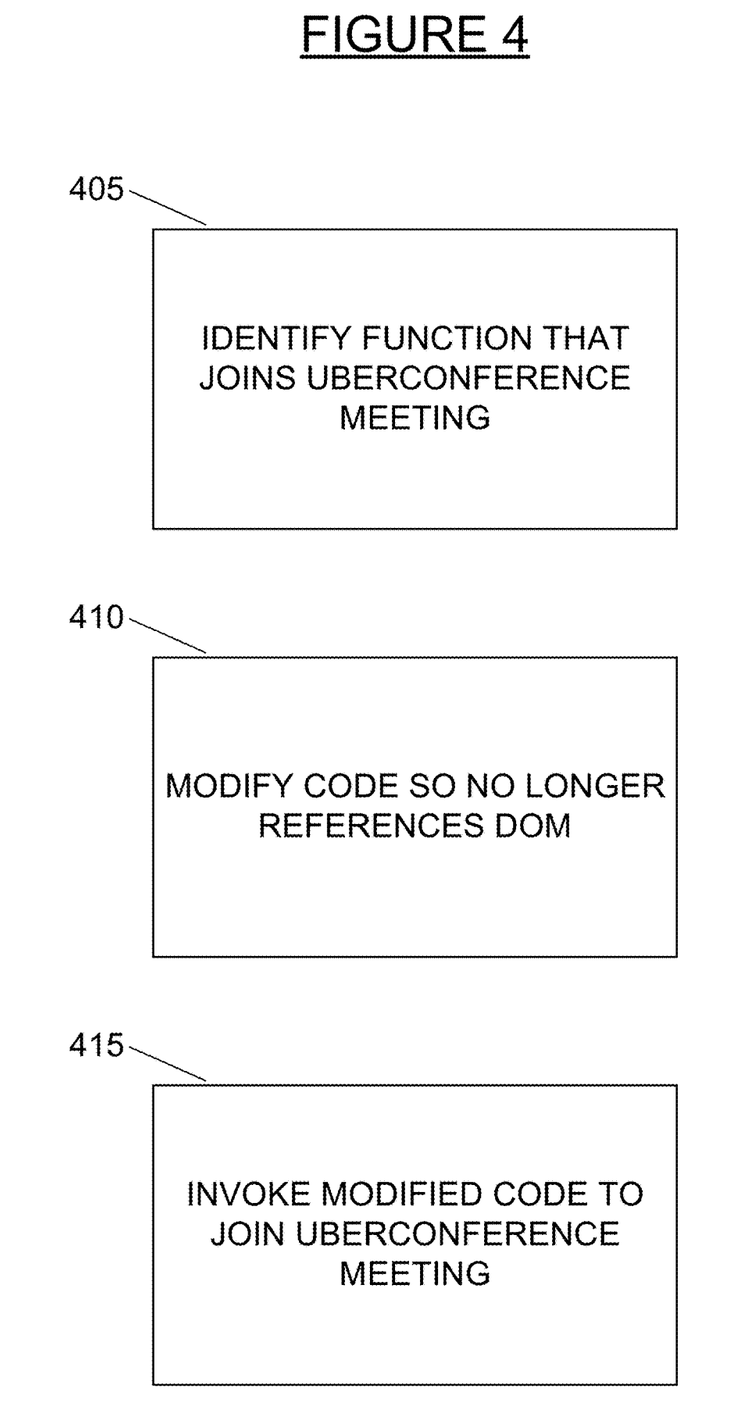
FIG. 4 illustrates calling into an UberConference meeting, according to an embodiment.
Figure 5:
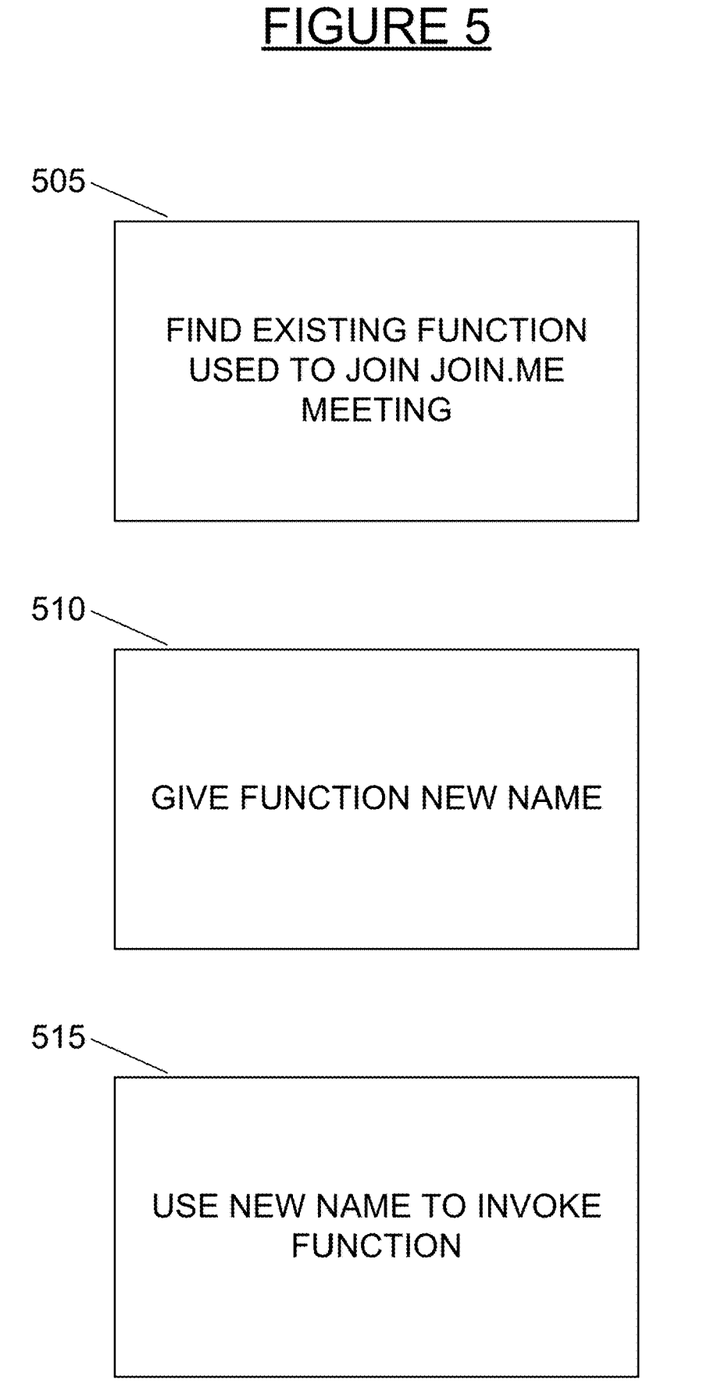
FIG. 5 illustrates calling into a Join.me meeting, according to an embodiment.

FIGS. 2-6 illustrates example methods for calling into a meeting without interacting with the DOM. FIG. 2 references calling into a Zoom meeting, according to an embodiment. FIG. 3 references calling into a WebEx meeting, according to an embodiment. FIG. 4 references calling into an UberConference meeting, according to an embodiment. FIG. 5 references calling into a Join.me meeting, according to an embodiment. FIG. 4 references calling into a GoToMeeting, according to an embodiment.

With respect to the Zoom meeting in FIG. 2, In 205, a search can be performed for an underlying function that is used to call the bot directly without interacting with the DOM itself. For example, an existing function that is normally used to start the meeting can be found. In one embodiment, the function can reference the DOM (or GUI) as follows:

```
function formSubmit( ){
var confNo=Trim($('#join-confno').val( );
var username=$('#join-username').val( )
}
```

In 210, the found underlying function can be modified so that it takes parameters instead of referencing the DOM (or GUI). For example, the following can be used instead of the two lines above in bold that reference the DOM:
function formSubmit(confNo, userName)

In 215, the modified function can be invoked with values obtained from our system instead of from the DOM (or GUI) in order to join the meeting bot. For example:
joinmeeting.formSubmit(callInNumber, botName)

With respect to the WebEx meeting in FIG. 3, in 305, a function that WebEx uses to launch a meeting is identified:

```
function_getLaunchCalendarMeetingFunc( ){
    const elem=document.querySelector(".meeting-join")
    return elem &&
    elem._vue_&&
    typeof elem._vue_.smartLaunchMeeting==='function'
        &&
    elem._vue_.smartLaunchMeeting
}
```

In 310, a differently named reference to Webex's smartLaunchMeeting function can be obtained:
const
launchCalendarMeetingFunc=_getLaunchCalendarMeetingFunc( );

In 315, Webex's smartLaunchMeeting function can be invoked to start the meeting without interacting with the GUI (e.g., clicking any buttons):
launchCalendarMeetingFunc('thinclientjoin');

With respect to the UberConference meeting in FIG. 4, in 405, the function that causes the page to join the meeting can be identified:

```
const obj={
    _next: function(n) {
    // . . .
    , u=r.name.$el.val( )
    , d=r.name.$el.val( )
    // . . .
```

```
    }
}
```
In 410, the code can be modified so that it no longer references the GUI. For example, see how the code in bold changes from the code illustrated for 405:
```
const obj={
_next: function(n) {
//
 , u=_botName
 , u=_botEmail
//
 }
}
```
In 415, the modified code can be invoked to launch the UberConference meeting:
this._next( )

With respect to the to the Join.me meeting in FIG. 5, in 505, an existing function that is called in the normal flow of a user joining the meeting is located. For example, the following function can be found:
```
function ( ){
e.$broadcast("Visitor.Join",  t.visitorNameCtrl.visitorName)
}
```
In 510, the function is given a new (e.g., global) name so that it can be referenced in a later window. For example:
```
JOINME_LOGIN_=function ( ){
e.$broadcast("Visitor.Join",  t.visitorNameCtrl.visitorName)
}
```
In 515, the new reference can be used to invoke the underlying function in a later window. For example:
JOINME_LOGIN_( )

Figure 6:
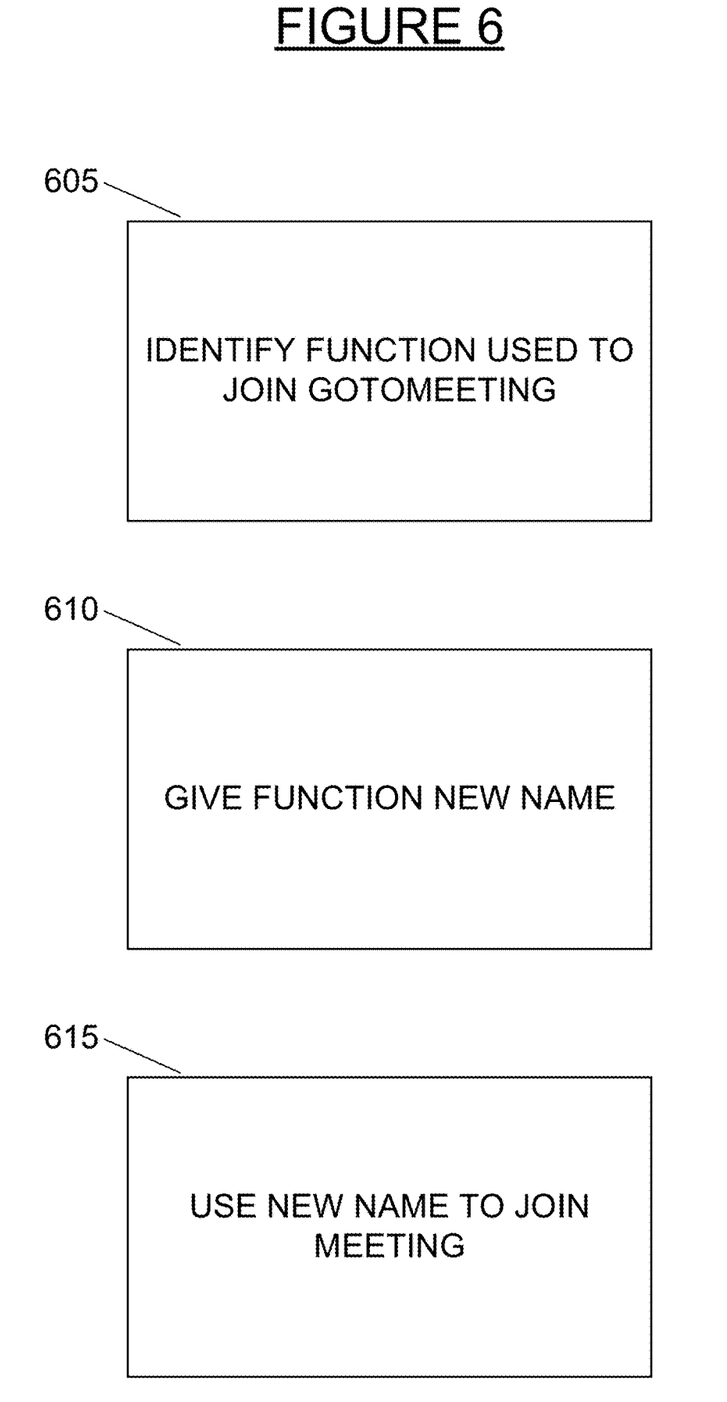
FIG. 6 illustrates calling into a GoToMeeting, according to an embodiment.

With respect to the GoToMeeting in FIG. 6, in 605, an existing function that is called in the normal flow of a user joining a meeting can be located. For example:
function ( ){e.submit( )}

In 610, the function is given a new (e.g., global) name so that it can be referenced in a later window. For example:
submitMyForm=function ( ){e.submit( )}

In 615, the new reference can be used to invoke the underlying function in a later window. For example:
submitMyForm( )

While various embodiments have been described above, it should be understood that they have been presented by way of example and not limitation. It will be apparent to persons skilled in the relevant art(s) that various changes in form and detail may be made therein without departing from the spirit and scope. In fact, after reading the above description, it will be apparent to one skilled in the relevant art(s) how to implement alternative embodiments. Thus, the present embodiments should not be limited by any of the above-described embodiments.

In addition, it should be understood that any figures which highlight the functionality and advantages are presented for example purposes only. The disclosed methodology and system are each sufficiently flexible and configurable such that they may be utilized in ways other than that shown. For example, the steps and/or limitations may be performed in a different order then that shown in the specification and/or claims.

Although the term "at least one" may often be used in the specification, claims and drawings, the terms "a", "an", "the", "said", etc. also signify "at least one" or "the at least one" in the specification, claims and drawings.

Additionally, the terms "including", "comprising" or similar terms in the specification, claims and drawings should be interpreted as meaning "including, but not limited to."

Finally, it is the applicant's intent that only claims that include the express language "means for" or "step for" be interpreted under 35 U.S.C. 212, paragraph 6. Claims that do not expressly include the phrase "means for" or "step for" are not to be interpreted under 35 U.S.C. 212, paragraph 6.

What is claimed is:

1. A method for enabling a recording bot server to join a video conference, comprising:
    finding a first function, wherein the first function interacts with a user interface element used by the recording bot server to join a video conference hosted by a human conference host computer for at least two human conference participants;
    replacing the first function with a second function; wherein the second function is a frozen code version used by the recording bot server to join the video conference such that the recording bot server does not interact with the user interface element, wherein the frozen code version comprises a modified participant code version or a code version that exposes underlying functions of a participant code version; and
    using the second function for the recording bot server to join the video conference without interacting with a document object model (DOM).

2. The method of claim 1, wherein the video conference is a Zoom video conference.

3. The method of claim 1, wherein the video conference is an UberConference video conference.

4. The method of claim 1, wherein the video conference is invoked through code and not invoked through use of the user interface element.

5. The method of claim 1, wherein the first function is modified to create the second function.

6. The method of claim 1, wherein an Internet is used to join the video conference.

7. The method of claim 1, wherein an Intranet is used to join the video conference.

8. The method of claim 1, wherein the user interface element is the document object model (DOM).

9. The method of claim 1, wherein the user interface element is a graphical user interface (GUI).

10. The method of claim 1, wherein the user interface element is a user interface (UI).

11. A system for enabling a recording bot server to join a video conference, comprising:
    a processor configured for:
    finding a first function, wherein the first function interacts with a user interface element used by the recording bot server to join a video conference hosted by a human conference host computer for at least two human conference participants;
    replacing the first function with a second function; wherein the second function is a frozen code version used by the recording bot server to join the video conference such that the recording bot server does not interact with the user interface element, wherein the frozen code version comprises a modified participant code version or a code version that exposes underlying functions of a participant code version; and
    using the second function for the recording bot server to join the video conference without interacting with an document object model (DOM).

12. The system of claim 11, wherein the video conference is a Zoom video conference.

13. The system of claim 11, wherein the video conference is an UberConference video conference.

14. The system of claim 11, wherein the video conference is invoked through code and not invoked through use of the user interface element.

15. The system of claim 11, wherein the first function is modified to create the second function.

16. The system of claim 11, wherein an Internet is used to join the video conference.

17. The system of claim 11, wherein an Intranet is used to join the video conference.

18. The system of claim 11, wherein the user interface element is the document object model (DOM).

19. The system of claim 11, wherein the user interface element is a user interface (UI) conference.

\* \* \* \* \*